(12) United States Patent
Uzarski et al.

(10) Patent No.: US 7,058,544 B2
(45) Date of Patent: Jun. 6, 2006

(54) KNOWLEDGE-BASED CONDITION SURVEY INSPECTION (KBCSI) FRAMEWORK AND PROCEDURE

(75) Inventors: Donald R. Uzarski, Champaign, IL (US); Michael N. Grussing, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 213 days.

(21) Appl. No.: 10/886,609

(22) Filed: Jul. 9, 2004

(65) Prior Publication Data

US 2006/0009935 A1     Jan. 12, 2006

(51) Int. Cl.
G06F 19/00     (2006.01)
(52) U.S. Cl. ........................................ 702/184; 702/182
(58) Field of Classification Search .................. 702/83, 702/182, 184
See application file for complete search history.

(56) References Cited

U.S. PATENT DOCUMENTS

| | | | |
|---|---|---|---|
| 4,998,208 A | 3/1991 | Buhrow et al. | |
| 6,021,359 A | 2/2000 | Sakakibara et al. | |
| 6,047,241 A | 4/2000 | Sparago | |
| 6,597,973 B1 | 7/2003 | Barich et al. | |
| 6,813,532 B1* | 11/2004 | Eryurek et al. | 700/108 |
| 6,928,391 B1* | 8/2005 | Fujiyama et al. | 702/185 |
| 2003/0097288 A1 | 5/2003 | Shimomura et al. | |

* cited by examiner

Primary Examiner—Michael Nghiem
Assistant Examiner—Douglas N Washburn
(74) Attorney, Agent, or Firm—Earl H. Baugher, Jr.

(57) ABSTRACT

A knowledge-based condition survey inspection (KBSCI) framework and procedure for use with an engineering management system (EMS) that tailors types of condition survey inspections (CSIs) and inspection intervals to empirically-established life cycles of component-sections. Embodiments of the invention facilitate proactive life cycle management, scheduling appropriate types of CSIs only when needed. The frequency and type of inspection is tailored to items important to a facility manager, such as the importance to the operation of individual component-sections and their individual life cycle, not the overall life cycle of a system or facility. Further, additional useful information is available from the data collected to maintain embodiments of the KBCSI framework so that meaningful "What-If" analysis may be performed in support of decision makers. By tailoring CSIs to needs rather than an arbitrary inspection schedule designed to only catch deficiencies, significant life cycle cost savings are realized.

33 Claims, 5 Drawing Sheets

US 7,058,544 B2

KNOWLEDGE-BASED CONDITION SURVEY INSPECTION (KBCSI) FRAMEWORK AND PROCEDURE

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

Embodiments of the present invention may be used to complement an engineering management system (EMS) such as BUILDER™. BUILDER™ is a product in the family of Engineered Management Systems (EMS) developed by the U.S. Army Corps of Engineers at its Engineering Research and Development Center-Construction Engineering Research Laboratory (ERDC-CERL) in Champaign, Ill.

BUILDER™ combines engineering, architectural, and management methods with data base management software to provide decision support. BUILDER™ provides engineers and facility managers with an automated tool to support decisions regarding what, when, where, and how best to maintain buildings and their key components.

BUILDER™ consists of three interrelated activities: 1) data collection in the field, 2) data entry into a database management system and other data management activity, and 3) manipulation of the resultant database for decision support. BUILDER™ supports: assessing condition objectively, establishing minimum acceptable condition criteria, budgeting, using "What if" scenarios, prioritizing work, developing annual work plans, monitoring contractor performance, establishing a condition history, and scheduling re-inspection. BUILDER™ also accommodates automating the presentation of data to decision makers in briefings and reports.

BUILDER™ provides outputs such as: automated inspection procedures and schedules, benefit analyses, budget optimization analyses, and engineering analyses, all with enhanced graphics for presentation to decision makers. Because BUILDER™ uses a standard database software program, it interfaces easily with other EMS programs using the same or compatible database software developed by ERDC-CERL, such as ROOFER™, PAVER™, PIPER™, etc.

BUILDER™ uses as its primary condition measure a condition index (CI) rating on a scale of 0–100. The CI for each component (termed component-section hereafter) is computed from inspection data that records the type, severity, and density of each discovered "problem" or "anomaly" (termed "distress" in BUILDER™). Empirically-developed deterioration curves (termed life cycle (LC) curves hereafter) show the optimal point at which maintenance work should be done to avoid costly rehabilitation or premature replacement.

With the assistance of the IMPACT™ simulation program included with BUILDER™, facility managers can develop long-range work plans based on a sound investment strategy. By. providing an objective description of condition and an automated means of exploring various options under different budget scenarios, BUILDER™ and IMPAC™ together facilitate formulating multi-year work plans and justifying funding requests.

Although BUILDER™ was developed for military installations, it may be used by any organization that has facility management responsibilities. Version 2.2 of BUILDER™ was released in December of 2003. There are new features and program enhancements in BUILDER™ 2.2 that improve the user interface and advance the science of building asset management. A list of the most significant enhancements is provided below.

BUILDER™ Stand-Alone Remote Entry Database (RED). The RED program for BUILDER™ has been improved for greater ease of use while in the field. These enhancements translate into significant speed and accuracy improvements during the inventory and condition survey inspection (CSI) collection process.

BUILDING COPY and BUILDING TEMPLATES. The one-time collection of building data is-the most costly phase in BUILDER™ implementation. As a result, BUILDER™ 2.2 has added features to speed up this process. When a group of buildings are identical or nearly identical and all built around the same time, the "BUILDING COPY" feature is a useful tool. It allows you to collect the inventory for one building and copy it for describing other similar buildings. This bypasses the need to inventory each like building separately. In addition, for a "typical" building, i.e., one not identical to other buildings in your portfolio but basically alike, a "BUILDING TEMPLATE" may be created for that building type. For all buildings of the same type a system inventory may be completed from that template. Inventory quantities may be scaled according to building size and the current template may be adjusted to ±10%. Each "component-section" of the building is initially dated automatically to the year of construction of the building. Multiple such templates may be created and stored in an e-library.

Installation Date Estimation. In BUILDER™ v.2.2, the assumption is made that component-sections are replaced after a reasonable expected (predicted) life cycle. Version 2.2 compares the age of the building to the Expected Service Life of the component-section to develop an accurate default value for the installation date. This feature facilitates quickly creating an inventory model. When BUILDER™ automatically creates the system inventory, the estimated age of each component-section is developed from current data, yielding accurate projections of condition.

Estimation Date Check Box. BUILDER™ v.2.2 also recognizes that many times the installation date for many component-sections is unknown. A check box has been added to flag such instances. When checked, the installation date is displayed with a yellow background, indicating an estimate. Estimated dates are also denoted on the system inventory report to alert of the need to verify installation dates.

Distress CSI with Quantities. In addition to choosing an estimated range for the affected distress density, BUILDER™ v.2.2 allows the option of entering the quantity of measured component-sections and affected distress quantity. BUILDER™ v.2.2 then calculates an appropriate density range from this input. For large samples, this feature provides a better estimate of the affected quantity. In addition, it provides quantitative information about a given distress for planning scope of repair or replacement work.

Project Creation. With previous versions of BUILDER™, the component-section is the fundamental "management unit." While also true for v.2.2, in BUILDER™ v.2.2 component-section work items may be combined for management as a single project. Thus, the project planning, funding, execution, and completion of these work items may be controlled under a single project. These projects are prioritized and ranked and compete for funding with other items in the work plan list.

Automatic Inventory/Inspection Updates. As work gets denoted as completed in BUILDER™ v.2.2, inventory and inspection records are automatically updated. This includes updating the year installed, material/equipment category and component-section type and quantity in the inventory if a component-section is replaced. Automatic inspection dates are scheduled to reflect the improvement in condition when items are replaced, repaired, or painted.

Fiscal Start Date Configuration. BUILDER™ v.2.2 allows for a fiscal year start date. This date is used by IMPACT™ to estimate completion dates for both existing line items and evaluation of new work items.

The IMPAC™ program has been released in v.1.1. Some of the key enhancements of v.1.1 are discussed below.

System Selection for IMPACT™ Simulation. IMPACT™ v.1.1 permits defining the scope of an IMPACT™ scenario for selected systems. Thus, for example, separate work plans for Roofing, HVAC, or interior work may be created. By running simulations for only select systems, the processing time for IMPACT™ simulation is decreased.

Building Status Changes. IMPAC™ identifies building status changes that will take place within the horizon of a scenario. For example, if a building is scheduled to be demolished within the time frame of a multi-year simulation, IMPAC™ v.1.1 recognizes the status change and applies a different standard level to the building so as not to budget money for renovation as it nears demolition.

Adding Buildings During an IMPACT™ Scenario. IMPAC™ v.1.1 permits identifying when a new building footprint will enter inventory. These new buildings will automatically be entered into the simulation and compete for funding with existing inventory.

Conventional methods of scheduling inspections most often schedule inspections at set time intervals with little or no regard to the characteristics or importance of the individual component-section. Typical inspection intervals may be two or more years and are often set using budgetary constraints of only the inspection costs. The frequency of inspection for individual buildings and systems within the buildings may vary. However, individual component-sections are often not considered in scheduling inspections even though each has its unique life cycle. Further, conventional inspections are often conducted as "deficiency" inspections, i.e., deficiency inspections document only what is wrong with various component-sections with a goal of addressing only the discovered deficiencies and not assessing overall condition of the component-section. Conventional deficiency inspections fill the "job jar." Because of budget constraints, the "job jar" is seldom emptied and the conventional procedure insures repeating the same inefficiencies with little room for feedback or "lessons learned." Conventional inspection methods are expensive in that some items are inspected too often and others are inspected only after replacement is the only option.

Embodiments of the present invention include a framework and procedure for establishing a condition survey inspection (CSI) schedule based on measuring individual component-section's condition and "degradation" or "deterioration" trend, thus establishing an empirically-derived life cycle for making decisions on when to inspect that component-section, independent of any arbitrary inspection interval. Embodiments of the present invention support a range of decision support activities, such as budgeting, scheduling, planning, performance assessment, etc., resulting in a management tool that does more than just filling a "job jar." The approach used by embodiments of the present invention reduces overall cost by taking a tailored approach to life cycle cost. It uses a flexible Knowledge-Based Condition Survey Inspection (KBCSI) method to augment the BUILDER™ EMS and its complementary IMPACT™ software, as well as like engineering management systems. Embodiments provide a structure and procedure for defining inspection requirements and planning, scheduling, budgeting, re-scheduling, and prioritizing inspection activity as well as permitting post-work assessment.

DETAILED DESCRIPTION

Figure 1:
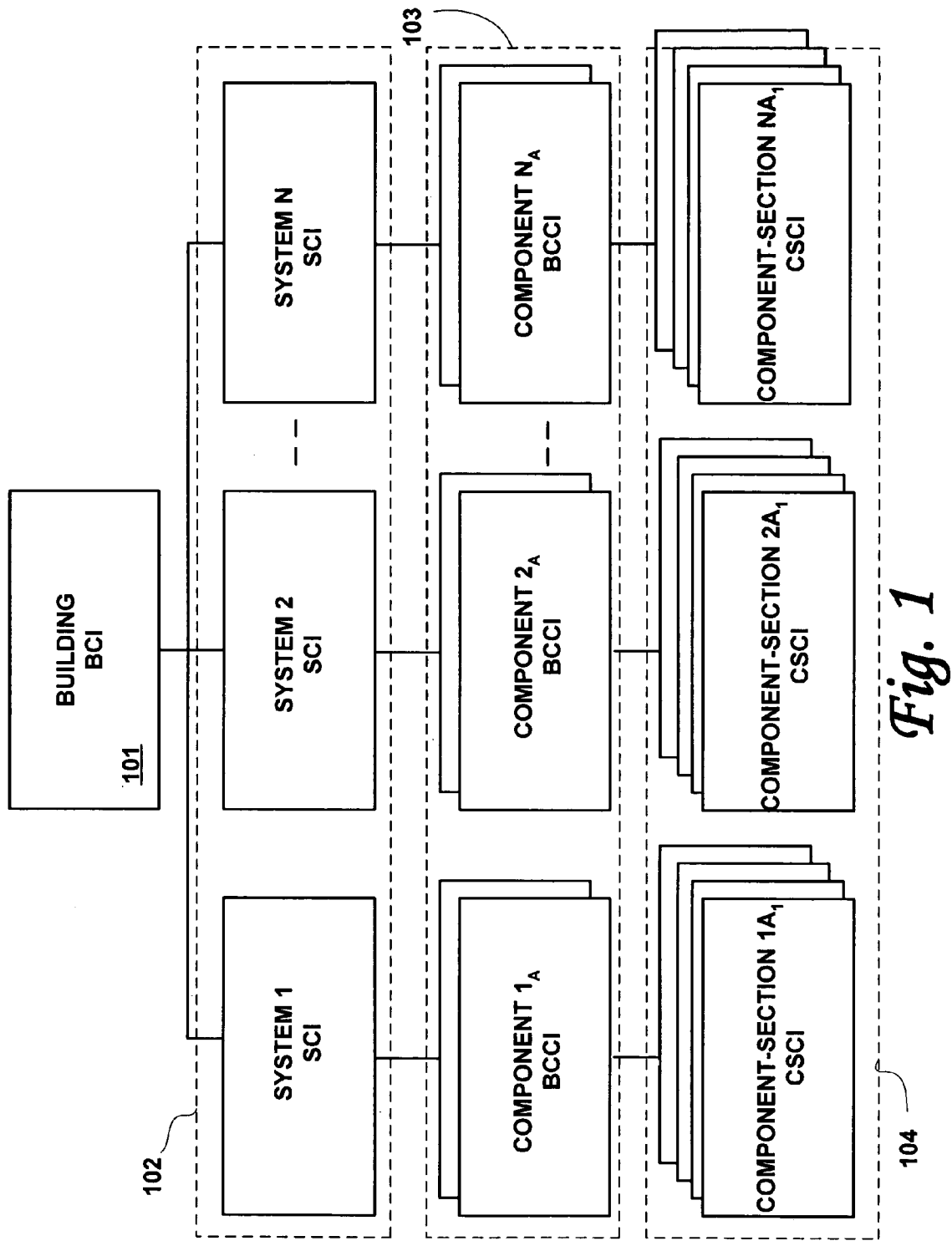
FIG. 1 depicts a sample hierarchy for rolling up condition indexes (CIs), the establishment of which are facilitated by employing an embodiment of the present invention.

A knowledge-based condition survey inspection (KBCSI) framework and procedure complements an engineering management system (EMS) employing "commercially available" database software, such as MICROSOFT® ACCESS®. Among other advantages, linking KBCSI to an automated EMS supports decision makers in accomplishing routine facility management activities that include: defining framework elements; establishing requirements and planning, scheduling, prioritizing and budgeting "sustainment/restoration modernization" (SRM) activity; and evaluating contractor performance.

A framework for implementing KBCSI in an EMS is defined and requirements established for conducting condition survey inspections (CSIs). Executing an initial KBCSI provides data for computing the initial condition index (CI) for a component-section, the indexes updated each time a CSI is accomplished thereafter. As used with a KBSCI in support of an EMS such as BUILDER™, such an index is termed the Component-Section Condition Index (CSCI).

In general, embodiments of the present invention provide a method for tailoring inspections and maintenance of component-sections of components that may be incorporated in systems within facilities. The component-sections have an established life cycle. The method comprises first linking to one or more databases of one or more engineering management systems (EMS), wherein the linking provides one or more identifiers and one or more parameters identified with each component-section of interest. Next one or more types of condition survey inspections are identified for use. Criteria are then established for inspection of the component-sections during their expected (predicted) life cycle. Some of the criteria may be established from data collected during a condition survey inspection of the component-section. A component-section condition index (CSCI) is defined with discrete values for aiding in assessing the condition of the individual component-sections. One or more algorithms are employed to establish a relationship between the values of the condition index and elapsed time over the life cycle of each component-section. The algorithms may use data from one or more condition survey inspections and pre-specified criteria to establish the relationship. One way the relationship may be presented to a facility manager is in the form of a life cycle (LC) curve of the component-section as displayed on a graph. Areas on the curve may be delineated as defining one or more zones within the relationship by applying the criteria, inspection data, or both. Within each zone, one or more types of condition survey inspections may be recommended as optimum. Further, the frequency of conducting condition survey inspections may be optimized by applying the pre-specified criteria and information learned by recently conducted condition survey inspection. The method enables condition survey inspections of specific component-sections to be tailored based on the life cycle of those component-sections.

The criteria used with the method may include, but not be limited to: facility usage importance, system usage importance, component-section usage importance, expected service life of the component-section of interest, remaining service life (RSL) of the component-section, maintenance life of the component-section, remaining maintenance life (RML) of the component-section, rate of deterioration of the component-section, specific distress tracking (from past inspection) of the component-section, condition zone within which the component-section lies, condition standards applied to the component-section, deterioration factor (as defined below), CSCI gain (as defined below), mission dependency index (MDI) (as defined below), and maximum timeframe between condition survey inspections (as defined below).

One engineering management system to which the method may be applied by linking to its databases is BUILDER™. The types of condition survey inspections that may be employed include, but are not limited to: direct ratings, direct ratings with sampling, direct ratings without sampling, paint ratings, paint ratings with sampling, paint ratings without sampling, distress surveys, distress surveys with sampling, distress surveys without sampling, distress surveys with quantities, and combinations thereof.

Some embodiments of the present invention use a condition index having a range of 0–100 and describe five zones over the life cycle of the component-section: an initial zone, a pre-sweet spot zone, a sweet spot zone, a post-sweet spot zone, and a dead zone. The sweet spot zone incorporates a sweet spot defined as a time interval in the life cycle of the component-section when performing maintenance on the component-section is predicted to be optimal.

The method provides for establishing the instantaneous rate of deterioration for the component-section as determined at a given point in its life cycle by calculating the slope of the tangent to the life cycle (LC) curve at that point. The method also provides for applying the deterioration factor to determine if scheduling at least one condition survey inspection, in an upcoming inspection period for example, may be warranted.

The method may provide for iterating the algorithms at least after maintenance has been performed on each component-section, where performing maintenance may have resulted in altering at least one of the criteria, the life cycle, the zones, or the LC curve. Upon iteration, it may be appropriate to apply a factor termed CSCI gain to modify the LC curve to more accurately describe the current life cycle of the component-section, to re-establish zones, and to re-draw the LC curve.

The method also may provide for assigning an optimal type of condition survey inspection to each zone. The method further may comprise rolling up the condition indexes as represented by the LC curve into a condition index of a component of the facility that incorporates that component-section.

The method also establishes objectives and provides guidance as to which types of condition survey inspections may fulfill each objective.

Also provided in embodiments of the present invention, is a method for managing facilities that may incorporate systems, components and component-sections. The component sections are incorporated in a component and have an established life cycle. In general this method comprises providing an engineering management system (EMS) incorporating one or more databases and linking to one or more of these databases. Once this linking has been established, the method employs the same general approach as above to facilitate managing the inspection and maintenance of facilities. An appropriate EMS for use with this method is BUILDER™.

Refer to FIG. 1 for a sample hierarchy for rolling up condition indexes from component-section (CSCI) level 104 through building component (BCCI) 103 and system (SCI) 102 levels to that of a complete building (BCI) 101. In BUILDER™, the CSCIs 104 are rolled up to the building component level 103 to provide a Building Component Condition Index (BCCI) that may be further rolled into the system level 104 to yield a System Condition Index (SCI), depending on building size and complexity. The SCIs are finally rolled into Building Condition indexes (BCIs) 101 that may be further averaged (not shown separately) for groups of buildings, complexes, or installations. Other indexes may be employed.

Where sampling is used in the CSI, a Sample Unit Condition Index (SUCI) may be computed. For painted surfaces on the building, a Coating Condition Index (CCI) may be computed. All indexes are used to assess the condition of the facility (building). Using algorithms incorporated in BUILDER™, CIs are computed automatically from data collected using the KBCSI.

The inventory of buildings, systems, components and component-sections has been loaded in the EMS, e.g., BUILDER™, prior to implementation of a KBCSI. An inventory provides the number and description of elements (systems, components, and the basic component-sections) in the building that are to be "sustained and repaired." A "component-section" may be differentiated by the type and amount of material of which it is made. For example, parts of an "exterior wall finish/covering" may be made of wood and other parts of masonry. Component-sections may-be created to meet an individual user's requirements based on layout or functional use. For example, "interior ceiling" may comprise one component-section of "$1^{st}$ floor ceiling" and another of "$2^{nd}$ floor ceiling," although each may be identical but for location. In all cases, the condition assessment process supported by the KBCSI is conducted first at the component-section level. By definition, the component-section is the lowest level at which CIs are calculated.

Figure 2:
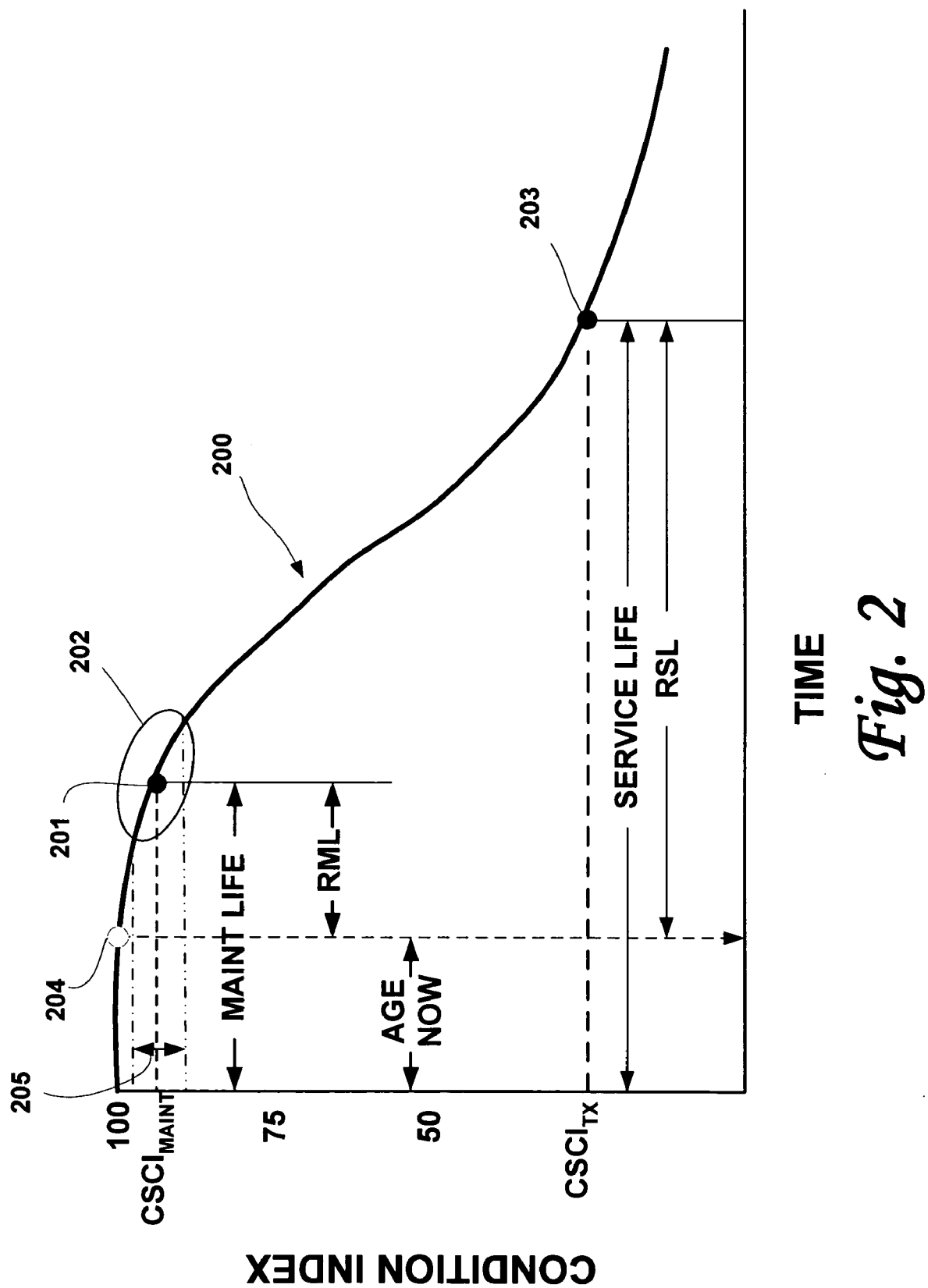
FIG. 2 represents the relationship between condition index (CI) and Time for the expected life cycle of a component-section, graphically defining terms that may be used in an embodiment of the present invention.

Refer to FIG. 2. BUILDER™ incorporates default Expected Service Life values for component-sections, as estimated from a compilation of sources. The actual values may differ widely between given sources. Thus, it is beneficial to perform a condition assessment to both establish and calibrate a relationship between predicted Condition Index (CI) and Time that may result in a life cycle (LC) curve 200 of the shape presented in FIG. 2. From this LC curve 200 two useful estimates may be obtained: the Remaining Maintenance Life (RML) and the Remaining Service Life (RSL) as discussed below.

In BUILDER™, the default Expected Service Life values are used to "seed" prediction models for an initial prediction of Expected Service Life. As condition data are added using embodiments of the present invention, the Expected Service Life, and the values resulting therefrom, such as RSL, are adjusted based on actual condition, yielding improved estimates of when a component-section may need refurbishment or replacement.

Each component-section has a unique life cycle. The life cycle is delimited by a finite Expected Service Life, shown as SERVICE LIFE in FIG. 2 at a $CSCI_{TX}$, i.e., terminal condition index value, at the end of which replacement or refurbishment is expected to be required. The end of the Expected Service Life is shown in FIG. 2 as point 203 on the life-cycle (LC) curve 200. The period between the AGE NOW, i.e., the point 204 on the LC curve 200, and the Expected Service Life point 203 is established as the RSL. Many component-sections also have an Expected Maintenance Life shown at point 201 on the LC curve 200, and depicted as MAINT LIFE in FIG. 2, at which point 201 some work is expected (predicted) to be needed to achieve the Expected Service Life. The period between AGE NOW, point 204, and the point 201 on the LC curve defining the Expected Maintenance Life is established as the RML. Both RSL and RML are used in embodiments of the present invention to assess condition of a component-section.

Although actual data may be used to calculate an improved estimate of RSL in a rather straightforward manner, determination of RML presents a more complicated estimation process. BUILDER™ provides a function to address this for those maintenance actions that are not classed as preventive maintenance. Many component-sections exhibit a maintenance protocol that includes an optimum time interval during which maintenance should be performed, colloquially termed the "sweet spot" as indicated by the oval 202 along the LC curve 200. This sweet spot 202 represents a narrow range 205 of CSCI values, shown as $CSCI_{MAINT}$ in FIG. 2, that represent the optimum expected time interval during which maintenance or repair should be performed. An example is replacing a bearing in a fan before the blades are allowed to wobble and hit the frame, requiring further maintenance. Thus, performing work during the sweet spot 202 minimizes the "penalty cost" incurred from deferring maintenance, yielding life cycle cost (LCC) savings. User-defined "trigger points" for starting maintenance work, as defined in BUILDER™, for example, may be coupled to the sweet spot 202. These trigger points may be customized for types of buildings or systems, as well as for missions performed in the buildings or by the systems.

Figure 3:
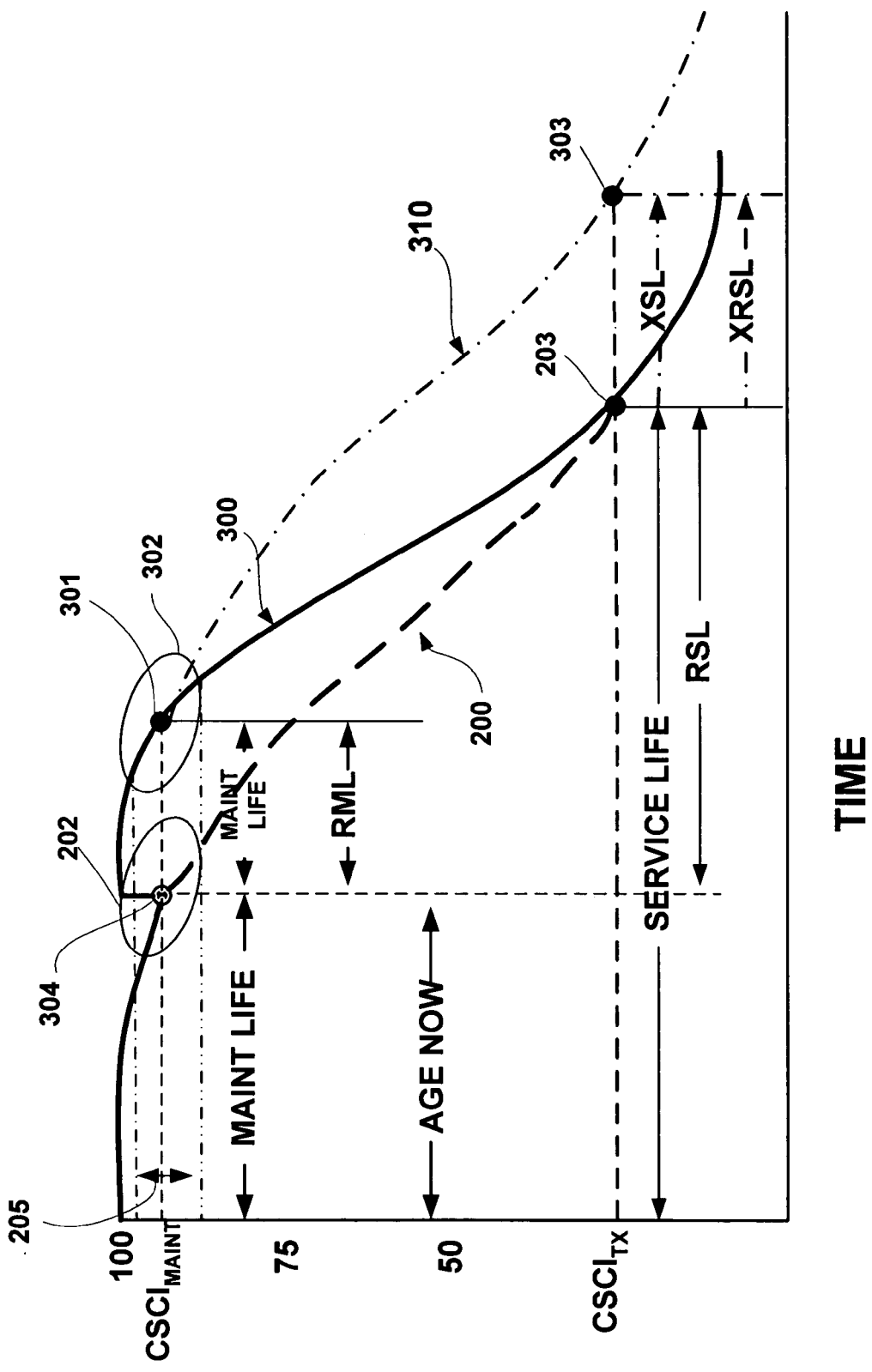
FIG. 3 is the life cycle (LC) curve presented in FIG. 2 as updated after performing a maintenance action on the component-section.

Refer to FIG. 3. Once a component-section has been inspected and had any necessary maintenance accomplished, i.e., repaired, refurbished, or replaced, the LC curve 200 resets as is depicted in FIG. 3 as LC curve 300. The initial LC curve 200, shown as part solid and part dashed-line in FIG. 3, is replaced with a new LC curve 300 that is calculated using data from the maintenance done at point 304 in FIG. 3, most likely during the sweet spot 202 of the LC curve 200 of FIG. 2. Point 304 in this iteration represents the AGE NOW of the component-section. This iteration uses the same $CSCI_{MAINT}$ range 205 as the first LC curve 200 although this need not remain the same. Thus the sweet spot, as represented by the oval 302, represents the same range 205 of CSCIs (i.e., position on the y-axis) for this iteration as it was for the initial seeding using the initial LC curve 200. This need not be the case, however, as the acceptable range 205 of CSCIs may change based on changing operating conditions, upgrades, etc.

A new maintenance point 301 may be chosen in the center of the new sweet spot 302 using a method similar to that used to establish the intial LC curve 200. In FIG. 3, the LC curve 300 is shown ending at the same Expected Service Life point 203 as for the initial LC curve 200. This may not represent the case where the component-section is actually replaced or refurbished at its maintenance point 304 rather than repaired. How much Expected Service Life is extended, if at all, is dependent on how extensive the work done at the maintenance point 304 was as represented by "CSCI Gain," that is what percentage of full capability was obtained. A typical maintenance action may extend the Expected Service Life as shown with the dashed-dotted curve 310, yielding an extended Expected Service Life (XSL) and concomitant extended Remaining Service Life (XRSL) that extends Expected Service Life to the point 303. Maximum gain of 100 is realized for this example as represented by the starting point of the curve 300. The post-maintenance CSCI, i.e., the CSCI at the start of the new LC curve 300, may be less than 100 if not all the "distresses" in the component-section are fully addressed by the maintenance performed at point 304. The curve 300 in FIG. 3 shows an anomolous condition where the CSCI Gain is actually maximum at 100 and the total Maintenance Life has been reduced and set equal to RML (since the new LC curve 300 starts at AGE NOW), but the Expected Service Life, still ending at point 203, has not been extended. This could result if other factors, such as operating cycle or load, were also changed at the point 304 on the LC curve 300.

BUILDER™ offers different types of CSIs. These are:
Distress CSIs (surveys) with Distress Quantities (DSwDQ)
Distress CSIs with or without Sampling (DSwS; DSw/oS)
Direct Condition ratings with or without Sampling (DRwS;DRw/oS)
Paint ratings with or without Sampling (PRwS;PRw/oS)

The DSwDQ provides a record for each component-section of the type of distresses present, e.g., cracked, damaged, deteriorated; the severity level, e.g., high, medium, low; and the quantity. This is the most detailed CSI but also the most time-consuming and expensive.

The DSwS or DSw/oS is similar to the DSwDQ but quantity is not recorded. Rather the density, defined as distress quantity divided by subcomponent amount, is estimated to be in one of a number of pre-specified ranges. Because of the estimation, it is faster and less expensive than the DSwDQ. Sampling is desirable if the component-section is large, complex or discontinuous.

The DRwS or DRw/oS provides for visually inspecting each component-section and evaluating it against a set of rating criteria and selecting the appropriate rating. No data are collected on distresses. It is faster and less expensive that DSwS or DSw/oS. Sampling is desirable if the component-section is large, complex or discontinuous.

PRwS or PRw/oS is used for painted surfaces. This rating is similar to DRwS or DRw/oS but limited to painted surfaces.

Performing CSIs permits:
Assigning a component-section condition index (CSCI)
Determining the roll-up CIs, such as BCCI, SCI, and BCI
Establishing a condition history Computing deterioration rates Establishing and refining the CSCI LC curves 200, 300, 310

Computing and iterating computation of RML to determine the sweet spot 202, 302

Planning, scheduling and budgeting facility maintenance work Quantifying work, i.e., filling the "Job Jar"

Supporting "fix or scrap" decisions

Computing RSL

Performing Quality Control (QC) of completed work (contractor evaluation)

At the completion of each CSI, a CSCI will be computed together with RSL (or paint life), RML, and a Rate of Deterioration approximated. Additionally, each roll-up CI, e.g., SCI, BCI, will be re-computed.

Refer to Table 1. Table 1 lists Objectives that may be targeted using an embodiment of the present invention and type of CSI that may be conducted to satisfy it.

depending on the specific type of component-section, its importance, and other factors such as need to maintain mission integrity.

Figure 4:
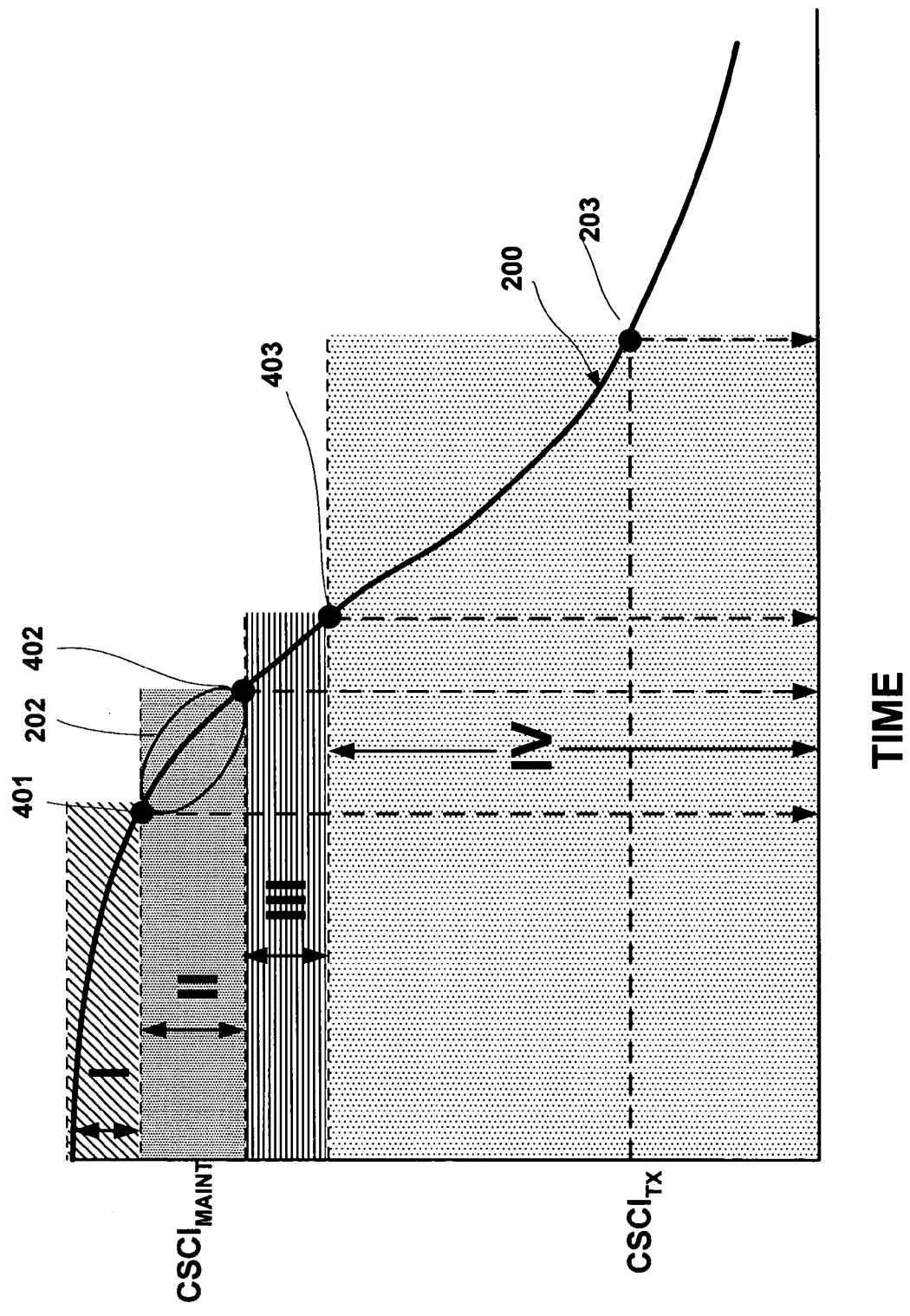
FIG. 4 depicts the intial LC curve of FIG. 2 segmented into four time periods in which various types of condition survey inspections, maintenance, or both may be required.

Region III, i.e., that period between point 402 and 403 on the LC curve 200 of FIG. 4, represents a relatively short period occurring immediately after the sweet spot 202 has been passed. Region III may represent the "first time" maintenance scenario that arises when budget shortfalls did not permit addressing maintenance requirements during the sweet spot 202. Work accomplished in Region III may require either repair or replacement. Further, repair may be more extensive than what would have been needed in Region II, or include refurbishment that would have not have been required at this time if done in Region II.

Finally, if first maintenance work is delayed until Region IV, i.e., after point 403 on the LC curve 200 of FIG. 4, it may

TABLE 1

CSI Matrix by Objective

| OBJECTIVE | DISTRESS W/QTY | DISTRESS | DIRECT | PAINT |
|---|---|---|---|---|
| 1. Determine condition of component section (CSCI) | X | X | X | X |
| 2. Determine Roll-Up Condition Index (SCI, BCI, etc.) | X | X | X | X |
| 3. Provide a condition history | X | X | X | X |
| 4. Compute deterioration rates | X | X | X | X |
| 5. Establish & maintain CSCI Prediction LC Curves | X | X | X | |
| 6. Compute current RML to estimate Sweet Spot | X | X | X | |
| 7. Determine scope of work for planning | X | X | X | X |
| 8. Quantify & refine work requirements (Job Jar) | X | | | |
| 9. Establish repair/replace criteria | X | X | | |
| 10. Calculate current RSL | X | X | X | |
| 11. Perform post-work assessment (QC) | X | X | | |

As seen in Table 1, the DSwDQ satisfies all Objectives, but it is expensive in both time and dollars. By matching needs to the least costly method that will meet the objective, cost savings may be realized. For example, although different approaches may be used-to satisfy an objective, factors to be considered when selecting one include where on the LC curve 200, 300, 310 the component-section is at the time of a CSI.

Refer to FIG. 4, displaying an intial LC curve 200 segmented into four time intervals (I–IV) in which CSIs may be conducted and maintenance may be accomplished. In Region I, i.e., that period prior to the earliest point 401 that defines the sweet spot 202, no maintenance (sustainment or refurbishment) work is foreseen. Although no maintenance is forecast for Region I, CSIs are needed to satisfy Objectives 1–6 of Table 1. The simplest and least expensive types of CSIs may be suitable, such as the Direct Rating and Paint Rating CSIs. Note that in the general case, calculating the RSL during this time interval is not of primary importance since it is probably far in the future. Further, although useful for determining work scope in the future, Objective 7 of Table 1, may be accomplished using a simple Direct Rating since setting work requirements now is beyond a normal planning horizon.

Region II, i.e., that period between points 401 and 402 on the LC curve 200 of FIG. 4, covers the sweet spot 202 during which time interval "normal" maintenance is predicted as being optimal. The sweet spot 202 has been predicted as the interval that may require some repair work in the general case, but may also require replacement or refurbishment be more cost effective to replace the component-section even though its full Expected Service Life as represented at point 203 has not been met.

Figure 5:
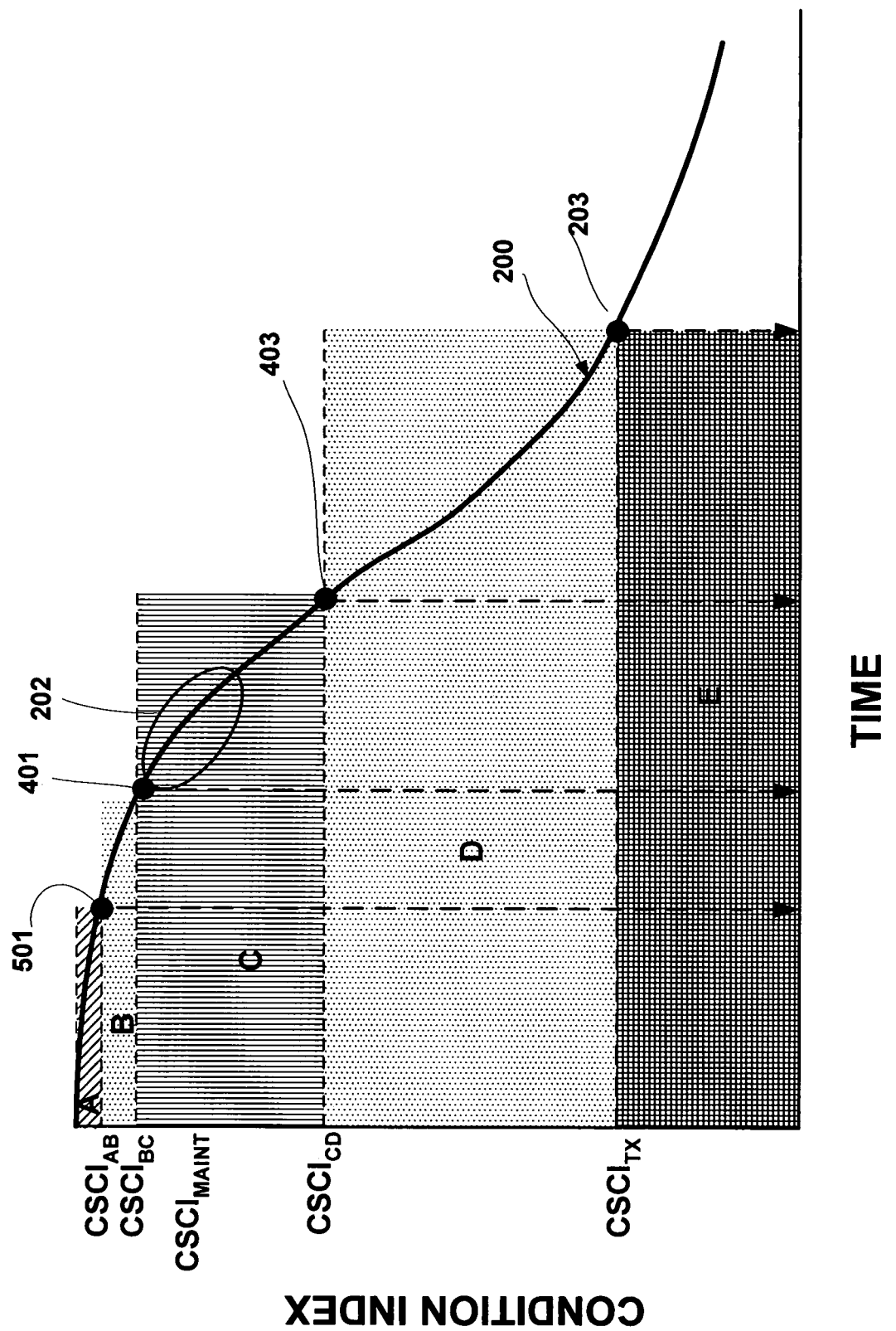
FIG. 5 shows the intial LC curve of FIG. 2 segmented into five time periods suited to specific types of CSIs.

Refer to FIG. 5, showing five "condition zones" A–E. Each zone represents an expected condition, defined by a range of CIs, as predicted by the initial LC curve 200 of FIG. 2. The "optimum" CSI type to be employed in each zone will be different. The condition index range for Zone A may be so close to 100 as to require only a Direct Rating with Sampling CSI (for component-sections large or complex enough to warrant sampling). The condition index range for Zone B is that defining what may be termed a "sweet spot approach zone" and, although no work may be scheduled for Zone B, a Distress CSI with Sampling (again for component-sections large or complex enough to warrant sampling) may be warranted to prepare for scheduling work in the sweet spot 202.

The CSCI boundary between Zone A and Zone B, designated at point 501 on the LC curve in FIG. 5, is an entry to the sweet spot 202. That condition index value, $CSCI_{AB}$, establishes the boundary between Zone A and Zone B and is determined from predicted change in the estimated rate of deterioration (the tangent to the curve 200 at a relevant point within Zone A) and the desired long-range work plan horizon (e.g., 5-year plan) as set by the facility manager. For example, assume the CSCI at the beginning of the sweet spot 202 is set by the facility manager at 70, the rate of deterioration is set at two points/year, and the horizon is set at five years. Zone B would begin at a CSCI of 80 or 10 "condition points" (5 years×2 points/yr) above the start of the sweet spot (shown at point 401 on LC curve 200, but not to scale).

Zone C encompasses the sweet spot 202 but extends beyond it by a small margin as shown in FIG. 5. Competing priorities may delay maintenance work beyond the optimal sweet spot 202 and this is taken into account in defining the boundaries of Zone C. However, deferring beyond a planned work period may require a Distress CSI with Quantities for the entire component-section to account for the incremental degradation in condition index below the sweet spot 202. Further, depending on how far the degradation has progressed, replacement may be a viable alternative in Zone C. Objective 9 of Table 1, "Establish when cost effective to replace," may be met in this zone, depending on when the CSI is conducted within Zone C.

Meeting the objective of quantifying distresses for maintenance work, i.e., Objective 8 in Table 1, is important to facility managers. Optimally, quantification provided by a Distress CSI with Quantity refines the scope of work and accurately estimates the cost. Essentially, it creates a "job" for inclusion in a "job jar." This type of CSI is sometimes referred to as the "Just-In-Time" (JIT) CSI. Although Objectives 1–6 of Table 1 will be met by this type of CSI, they are secondary to Objective 7, "Determine broad scope of work for future planning," and Objective 8. If it is found that not all of the component-section needs maintenance it may be split into two or more parts for creating jobs for the job jar.

The CSCI boundary, $CSCI_{BC}$, between Zone B and Zone C, i.e., establishing the sweet spot 202 start at point 401 on the LC curve 200, may be set by the facility manager. It may be based on two factors. The first is economic, i.e., to minimize the cost accruing from deferring work, if work is, in fact, deferred. The second is the minimum condition index at which the component-section should be maintained. Often, the economic critierion is used in setting the minimum condition index standard. Ideally, the boundary, $CSCI_{BC}$, should be the central point 201 of the sweet spot 202 of FIG. 2 minus one year to allow for quantification of work scope and adding the job to the job jar just in time for the next annual well-defined work plan. This boundary, defined at a condition index, $CSCI_{BC}$, of FIG. 5, is established in BUILDER™, serving as a trigger point for executing work or, as a minimum, identifying those component-section candidates to prioritize in scheduling work. The sweet spot 202 need not be the same for the same types of buildings or same types of building components, depending on the use of the building or the importance of a specific component-section in operation of the building.

Zone D in FIG. 5 is sometimes referred to as the "missed opportunity zone." Once in this zone, the primary objective is Objective 10 of Table 1, i.e., determining how much life is left, or RSL. Most often the economically feasible choice is replacement. Since replacement is warranted, there is no need to document distresses. For Zone D's less than optimal condition index, i.e., well past the sweet spot 202 and nearing the end of the Expected Service Life at point 203 on the LC curve 200, a Direct Rating with Sampling (for component-sections large or complex enough to warrant sampling) is all that is warranted since the optimum maintenance period has passed and the predicted RSL is short compared to the entire Expected Service Life. Further, since painting will be included in the replacement in most cases, there is no need to do a paint rating CSI. Objectives 1–5 and 7 are also met by a Direct Rating CSI.

Finally, for Zone E, often termed the "dead zone", that starts at the terminal index, $CSCI_{TX}$, the component-section exhibits a considerably "degraded" condition index, at and beyond the condition index, $CSCI_{TX}$, predicted at the end of Expected Service Life at point 203 on the LC curve 200. It would not be cost effective to do any CSIs in this zone. Objectives 1–3 of Table 1 are met and none of the others can be met or are meaningless with such a low CSCI.

Each of these CSI types are tailored for use in the above zones based on both the initial and any subsequent LC prediction curves 200, 300, 310 and provide data in support of establishing maintenance work requirements. For example, if the RML is a few years, a Direct Rating CSI may suffice. However, if the RML is a year or less, and it is desired to correct distresses, a Distress CSI with Quantities is appropriate.

There are exceptions to the above generalized scenarios defining the zones of FIG. 5. Three examples are given below. These are examples only and other scenarios may occur in practice.

Occasionally, a component-section is non-maintainable. One such type of component-section may be that type referred to as a "consumable." That is, it is "used up" routinely with little or no maintenance expected. These general types of component-sections are replaced as needed. Another type of non-maintainable is one exhibiting only a "run-to-fail" option with either a minimal risk at failure or a high risk. This may be the most general case of a "consumable." CSIs are not needed for these types. Those component-sections whose failure results in a high risk to resources or personnel require that replacement be scheduled prior to expected failure. Examples may include batteries in battery-powered alarms, fire retardant in fire extinguishers, etc. For those high risk component-sections, the sweet spot 202 is set at a point to assure continuity of service and replacement prior to the predicted end of Expected Service Life. The time of replacement is based on an acceptable risk tolerance.

Another exception is event controlled. If a catastrophic event, e.g., hurricane, earthquake, explosion, flood, etc. were to occur, the life cycle of the component-section may be aborted or restricted. Thus, after such an event, a CSI may be mandated. The type depends on the nature of the damage and urgency of repair.

Some component-sections may be "maintainable" but exhibit an inherent rapid rate of deterioration or have a short Expected Service Life in comparison to companion component-sections in the same system or building. These types may permit both Zone A and Zone B to be skipped because the sweet spot 202 approaches so rapidly in comparison to other component-sections in the same system or building.

Conventionally, the timing of inspections has been set on some fixed schedule, e.g., annually or bi-annually. This insures that some component-sections will be inspected "too often" and others not often enough. The KBCSI employed in embodiments of the present invention uses a flexible scheduling approach based on supporting the objectives listed in Table 1.

KBCSI considers the expected CSCIs of each of the component-sections and uses that information to calculate values for RML, RSL, condition zone location (e.g., Zones A–E), and rate of deterioration. Using these calculated values, and other criteria, such as budget and resource availability, employing a KBCSI tailors a CSI for those component-sections required to meet applicable objectives of Table 1 in a given year, and only those component-sections. Criteria used to implement embodiments of the present invention include, but may not be limited to:

Building/system usage importance
Component-section usage importance

Expected Service Life
RSL
Maintenance life
RML
Rate of deterioration
Specific distress tracking
Condition Zone
Condition standards
Maximum timeframe between CSIs
CSCI gain
Deterioration factor
Mission dependency index (MDI)

In BUILDER™ the importance of a building or system is measured by the mission dependency index (NMDI). However, if an NMDI value has not been determined, the function of the building or system may be used as a surrogate measure of importance, e.g., an operations building would have a higher use value than a storage shed.

The component-sections that are critical to operation of a system or building, such as the power grid or HVAC equipment, would be rated higher than ancillary systems such as background music or vending machines.

Those component-sections with a short life need to be surveyed (inspected) more often than those with long lives, all other factors being equal.

RSL may be a relatively important criteria in Zones A and D of FIG. 5. In Zone A, if the RSL is long, a CSI is needed less often than if it has a short RSL. In Zone D, CSIs should be scheduled at specific points prior to RSL going to zero.

Component-sections with short service lives need to be inspected more often than those with long service lives, all else being equal. Less change per year is expected for those with long lives and if the frequency of CSIs for component-sections with short lives is too far apart, the sweet spot 202 may be missed between CSIs.

RML sets the timing for CSIs. RML minus one year is a common time for performing a CSI. In BUILDER™, the IMPACT™ program has provisions for recommending work needs for future years that can be used to schedule these CSIs one year (or at some suitable time) prior to the predicted need for the maintenance action. In general, it is advantageous to have "work scheduled year minus one year" as the year for conducting a CSI.

If a component-section is deteriorating at a rapid rate or at a rate greater than predicted initially, the CSI should be scheduled more often.

In certain cases, a past CSI may have revealed particular distresses at a severity level that would require more frequent CSIs to track the rate at which the distress density is growing (if at all) or for changing the assessment "on the books" to a higher severity level.

Establishing a condition zone for a component-section aids in determining the type of CSI to do. The condition zone in which a component-section is assigned also sets the frequency when combined with the current values for RML and RSL.

Condition standards affect the range of the condition zone, building importance factor, and component-section importance factor. Taken together, these factors contribute to a desired frequency of CSIs.

A facility manager may set a maximum interval between CSIs to insure that a particular component-section does not go too long with a CSI. Criteria may be set to assure that no more than a set number of years lapses before any given component is inspected, regardless of the other factors used in determining CSI type and frequency.

EXAMPLE

In an embodiment of the present invention, the Knowledge-Based Inspection (KBI) Program is linked to BUILDER™ and selects from its database a subset of component-sections to consider for the next round of CSIs. The selection algorithm is based on pieces of data (knowledge) associated with each component-section. The program permits comparing these data with user-defined parameters as discussed below.

The KBI Program accesses information about the CSI history of a component-section to facilitate knowledgeable decisions about both the type of CSI and the timing of the CSI as relates to the next scheduled CSI cycle. There are four available CSI options in this embodiment:
Do Nothing
Direct rating (w/ or w/o sampling)
Distress survey (w/ or w/o sampling)
Distress survey with Quantities The KBI Program initially decides whether to include a component-section in the CSI subset of interest, e.g., a subset that would include CSIs scheduled for the upcoming CSI cycle. Some typical parameters used to make the decision are:

CI Zone Lower Bound. With reference to the zones (A–E) of FIG. 5, the CI Lower Bound ($CSCI_{AB}$, $CSCI_{BC}$, $CSCI_{CD}$, $CSCI_{TX}$) provides the dilineation between zones, each zone specifying a preference for a specific type of CSI.

Maximum CSI Interval. This interval is configurable for each zone. It specifies a maximum CSI interval regardless of the specification of longer intervals from calculations based on other parameters.

Number of CSIs in Each Zone. Using the upper and lower boundaries of each zone and expected rate of deterioration of the component-section, e.g., as determined from prior CSIs, the time interval a component-section will be in a specific zone may be calculated from the LC curve 200, 300, 310. A manager may set the number of CSIs while in this zone, with the interval of time between CSIs calculated from that figure. This number is empirically driven since it is based on data taken from prior CSIs and may be very different from the maximum CSI interval above.

Deterioration (Degradation) Factor. The Deterioration Factor is the maximum relative rate of deterioration, e.g., twice predicted base deterioration rate, compared to what was expected before triggering a CSI, e.g., approximately the predicted base deterioration rate. Based on the Expected Service Life and previously collected CSI data, BUILDER™ creates a "condition trend" curve, i.e., expected deterioration over time. The tangent to this curve is the deterioration rate at that point in time. If the deterioration rate is more than expected, as determined in calculating a baseline from prior CSIs, the component-section may be a candidate for re-inspection to verify the unexpected new rate. For example, if the Deterioration Factor were set to two (2), any measured deterioration rate of twice or more the expected base rate triggers another CSI. Based on the projected CI, the KBI Program determines which zone the component-section is in and how many CSIs are required in that zone. It then calculates the interval between CSIs in that zone. This interval is compared to the maximum CSI interval, and the lesser of the two is set as the "allowable interval." If the interval is allowed to extend beyond the "allowable interval" or if rate of deterioration verified by the latest CSI is greater than the allowable rate of deterioration set with the Deterioration Factor, this component-section is flagged for including in the next CSI.

Determining type of CSI. Once the KBI Program selects the subset of recommended component-sections for including in the next CSI, it must determine which CSI procedure to use for each assessment. Based on the CI zone that the component is projected to be in, general guidelines that may be used are:

| Zone A | Direct |
| Zone B | Distress |
| Zone C | Distress w/Qty |
| Zone D | Direct |
| Zone E | Do Nothing |

In some cases, a more detailed level of CSI may be warranted regardless of the above guidelines. If a detailed CSI were performed in a prior CSI, the same procedure may be recommended when in Zones A–C. For example, if the component-section is in Zone A and the prior CSI was a Distress CSI, the KBI Program would recommend a follow-on Distress CSI at the appropriate "allowable interval."

In one embodiment, the KBI Program uses MICROSOFT® ACCESS® database software with a VISUAL BASIC® interface. Upon opening the program, three options are presented. Using the KBI program initially requires linking to the database where the BUILDER™ data reside. Thus, initially one would select, e.g., by clicking, a button designated "Link to BUILDER™ Databases," one of the three options. This brings up a "Change Database Location" screen with three boxes: "Inventory," "Lookup," and "Reference." Clicking the button to the right of each database path (box) above brings up a drop down table to facilitate navigation to the appropriate database. Upon selecting the path for each of the three, clicking the "Done" button sets the paths to the chosen databases. In one embodiment, the "Inventory" database is loaded as the current BUILDER™ database. If it is desired to use a BUILDER™ database other than the current BUILDER™ database or another EMS database, this will need to be selected separately by going through the above three drop down lists as appropriate.

When establishing parameters for one embodiment of the KBI Program as used with BUILDER™, there are two options for sorting the inventory database. The first is by "Building Use." For Department of Defense (DoD) buildings, a different parameter may be set for nine (9) categories of facility use: Operational/Training, Maintenance/Production, R&D, Supply/Storage, Hospital/Medical, Administrative, Unaccompanied Personnel Housing, Community, and Family Housing. The second option is to sort by Mission Dependency Index (MDI) range. This assumes that an MDI assessment has been done for each facility and the appropriate data loaded in the database. In one embodiment, a different parameter set is chosen for each of the following MDI ranges: 100–86, 85–71, 70–55, 54–38, 37–20, and 19–0.

For the above embodiment, each Building Use group or MDI range may be chosen from the drop down list and the parameters for each may be adjusted within a matrix, that includes data such as Building Number, System, Component, Material or Equipment Category, Component Type, Section Name, Installation Date, RSL, RML, Projected CI, Quantity, etc. Upon setting all parameters in the matrix, a "Recompute Data" button is clicked and the information is refreshed.

In one embodiment, also available onscreen with the matrix is a display of status of the various Zones (A–E) with information such as lower boundary, number of CSIs within the zone, Deterioration (or Degradation) Factor, etc.

In one embodiment, also available onscreen with the matrix is a pie chart displaying how many of the component-sections are recommended for a CSI and how many of each type of CSI are recommended. Also included in an embodiment is a grid at the bottom of the screen that lists each component-section that is recommended for CSI together with select attributes of the component-section. This list may be printed or exported to an EXCEL® spreadsheet for further manipulation.

The KBCSI framework and method, as employed in embodiments of the present invention tailors inspection methods and intervals to established life cycles of individual component-sections. This tailoring enables decision support to be tailored throughout the life cycle of individual elements in a system or facility. CSIs need not be done only when the "whole system" or "whole facility" is scheduled for inspection but rather when it is determined to be needed via proactive life cycle management. The frequency and type of inspection is tailored to items important to a facility manager, such as the importance to the operation of individual component-sections and their individual life cycle, not the overall life cycle of a system or facility. Further, additional useful information is available from the data collected to maintain embodiments of the KBCSI framework so that meaningful "What-if" analysis may be performed in support of the decision makers. Finally, by tailoring CSIs to needs rather than an arbitrary and capricious inspection schedule designed to only catch deficiencies, significant life cycle cost savings are realized.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 CFR § 1.72(b). Any advantages and benefits described may not apply to all embodiments of the invention.

We claim:

1. A method for tailoring inspections and maintenance of component-sections of facilities that may incorporate components and systems, at least one said component-section incorporated in at least one said component, said component sections having an established life cycle, comprising:
   linking to at least one database of at least one engineering management system (EMS),
wherein said linking provides at least one identifier and at least one parameter for each said component-section;

establishing at least one type of condition survey inspection;

establishing at least one criterion for inspection of said component-sections during said life cycle, wherein at least one said criterion may be established from data collected during said condition survey inspections;

establishing at least one component-section condition index (CSCI) having discrete values for said component-sections;

employing at least one algorithm to establish a relationship between said values of said condition index and time over said life cycle of each said component-section, wherein said algorithm may use said data from at least one of said condition survey inspections and at least one of said criteria to at least partially establish said relationship, and wherein said relationship may be displayed as a curve on a graph;

defining at least one zone within said relationship by applying at least one of said criteria, wherein within each said zone, both said types of condition survey inspections and the frequency of conducting said condition survey inspections are optimized by at least applying said criteria; and wherein said method enables said condition survey inspections to be tailored based on the life cycle of said component-section.

2. The method of claim 1 in which said criteria are selected from the group consisting essentially of: facility usage importance, system usage importance, component-section usage importance, expected service life of at least said component-section, remaining service life (RSL) of said component-section, maintenance life of said component-section, remaining maintenance life (RML) of said component-section, rate of deterioration of said component-section, specific distress tracking of said component-section, condition zone within which said component lies, condition standards applied to said component-section, deterioration factor, CSCI gain, mission dependency index (MDI), and maximum timeframe between condition survey inspections.

3. The method of claim 1 in which said engineering management system is applied to building maintenance.

4. The method of claim 1 in which said types of condition survey inspections are selected from the group consisting essentially of: direct ratings, direct ratings with sampling, direct ratings without sampling, paint ratings, paint ratings with sampling, paint ratings without sampling, distress surveys, distress surveys with sampling, distress surveys without sampling, distress surveys with quantities, and combinations thereof.

5. The method of claim 1 in which said condition index has a range of 0–100.

6. The method of claim 1 in which five said zones are employed.

7. The method of claim 6 in which said five zones comprise: an initial zone, a pre-sweet spot zone, a sweet spot zone, a post-sweet spot zone, and a dead zone, wherein said sweet spot zone incorporates said sweet spot defined as a time interval in said life cycle when performing maintenance on said component-section is predicted to be optimal.

8. The method of claim 2 in which said rate of deterioration is determined at a given point in said life cycle by the slope of the tangent to said curve at said point.

9. The method of claim 2 further comprising applying said deterioration factor to determine if scheduling at least one said condition survey inspection may be warranted.

10. The method of claim 2 further comprising iterating said algorithm at least after maintenance has been performed on said component-section, wherein performing said maintenance may result in altering at least one said criteria, said life cycle, said zones, and said curve.

11. The method of claim 10 further comprising applying said CSCI gain to modify any of said life cycle, said zones, and said curve.

12. The method of claim 1 further comprising assigning an optimal said type of condition survey inspection to each said zone.

13. The method of claim 1 further comprising rolling up said relationship into a condition index of a component of said facility that incorporates said component-section.

14. The method of claim 1 further comprising establishing objectives that may be accomplished by each said type of condition survey inspections.

15. The method of claim 14 in which said objectives are selected from the group consisting essentially of: determining the current condition of a component-section and assigning a condition index; determining a current roll-up condition index; providing a condition history; computing deterioration rates; establishing and maintaining LC curves; computing remaining maintenance life to establish the sweet spot; determining scope of work for planning; quantifying and refining work requirements; establishing repair/replace criteria; calculating remaining service life; and performing post-work assessment.

16. A method for managing facilities that may incorporate systems, components and component-sections, at least one said component-section incorporated in at least one said component, said component sections having an established life cycle, comprising:

providing an engineering management system (EMS) incorporating at least one database;

linking to at least one said database, wherein said linking provides at least one identifier and at least one parameter for each said component-section;

establishing at least one type of condition survey inspection;

establishing at least one criterion for inspection of said component-sections during said life cycle, wherein at least one said criterion may be established from data collected during said condition survey inspections;

establishing at least one component-section condition index (CSCI) having discrete values for at least said component-sections;

employing at least one algorithm to establish a relationship between said values of said condition index and time over said life cycle of each said component-section, wherein said algorithm may use said data from at least one of said condition survey inspections and at least one of said criteria to at least partially establish said relationship, and wherein said relationship may be displayed as a curve on a graph;

defining at least one zone within said relationship by applying at least one of said criteria, wherein within each said zone, both said types of condition survey inspections and the frequency of conducting said condition survey inspections are optimized by at least applying said criteria; and rolling up said relationship into a condition index of at least a component of said facility that incorporates said component-section, wherein said method enables said condition survey inspections to be tailored based on the life cycle of said component-section.

17. The method of claim 16 in which said criteria are selected from the group consisting essentially of: facility usage importance, system usage importance, component-section usage importance, expected service life of at least said component-section, remaining service life (RSL) of said component-section, maintenance life of said component-section, remaining maintenance life (RML) of said component-section, rate of deterioration of said component-section, specific distress tracking of said component-section, condition zone within which said component lies, condition standards applied to said component-section, deterioration factor, CSCI gain, mission dependency index (MDI), and maximum timeframe between condition survey inspections.

18. The method of claim 16 in which said engineering management system is applied to building maintenance.

19. The method of claim 16 in which said types of condition survey inspections are selected from the group consisting essentially of: direct ratings, direct ratings with sampling, direct ratings without sampling, paint ratings, paint ratings with sampling, paint ratings without sampling, distress surveys, distress surveys with sampling, distress surveys without sampling, distress surveys with quantities, and combinations thereof.

20. The method of claim 16 in which said condition index has a range of 0–100.

21. The method of claim 16 in which five said zones are employed.

22. The method of claim 21 in which said five zones comprise: an initial zone, a pre-sweet spot zone, a sweet spot zone, a post-sweet spot zone, and a dead zone, wherein said sweet spot zone incorporates said sweet spot defined as a time interval in said life cycle when performing maintenance on said component-section is predicted to be optimal.

23. The method of claim 17 in which said rate of deterioration is determined at a given point in said life cycle by the slope of the tangent to said curve at said point.

24. The method of claim 17 further comprising applying said deterioration factor to determine if scheduling at least one said condition survey inspection may be warranted.

25. The method of claim 17 further comprising iterating said algorithm at least after maintenance has been performed on said component-section, wherein performing said maintenance may result in altering at least one said criteria, said life cycle, said zones, and said curve.

26. The method of claim 25 further comprising applying said CSCI gain to modify any of said life cycle, said zones, and said curve.

27. The method of claim 16 further comprising assigning an optimal said type of condition survey inspection to each said zone.

28. The method of claim 16 further comprising establishing objectives that may be accomplished by each said type of condition survey inspections.

29. The method of claim 28 in which said objectives are selected from the group consisting essentially of: determining the current condition of a component-section and assigning a condition index; determining a current roll-up condition index; providing a condition history; computing deterioration rates; establishing and maintaining LC curves; computing remaining maintenance life to establish the sweet spot; determining scope of work for planning; quantifying and refining work requirements; establishing repair/replace criteria; calculating remaining service life; and performing post-work assessment.

30. A knowledge-based condition survey inspection framework for use with an engineering management system (EMS) to manage maintenance of component-sections of components of a facility incorporating components and systems, comprising:
  a range of discrete condition indexes, said indexes used to assign a rating of condition for said component-section;
  a description of each of one or more types of condition survey inspection (CSI);
  a list of objectives to be met in said managing;
  a matrix listing applicability of each of said types of CSIs to said objectives;
  a list of criteria for at least determining at least one optimum type of said CSI to use and for establishing at least one interval during which to schedule said optimum type of CSI;
  data from at least one such CSI;
  means for applying said criteria and said data such that at least one life cycle (LC) curve representing said condition index of said component-section versus time may be developed; and
  a description of zones of interest to be applied to said LC curve to facilitate assigning a said optimum type of CSI within each said zone.

31. The framework of claim 30 further comprising means for linking said framework to at least one engineering management system (EMS).

32. The framework of claim 31 in which said EMS is applied to building maintenance.

33. The framework of claim 30 in which said means for applying said criteria comprise at least one algorithm.

* * * * *